(12) United States Patent
Kaczyński et al.

(10) Patent No.: US 11,228,910 B2
(45) Date of Patent: Jan. 18, 2022

(54) MOBILE COMMUNICATION DEVICE AND METHOD OF DETERMINING SECURITY STATUS THEREOF

(71) Applicant: V440 SPÓŁKA AKCYJNA, Warsaw (PL)

(72) Inventors: Kamil Kaczyński, Warsaw (PL); Michal Glet, Warsaw (PL)

(73) Assignee: V440 SPÓŁKA AKCYJNA, Warsaw (PL)

(*) Notice: Subject to any disclaimer, the term of this patent is extended or adjusted under 35 U.S.C. 154(b) by 359 days.

(21) Appl. No.: 16/257,371

(22) Filed: Jan. 25, 2019

(65) Prior Publication Data
US 2020/0245134 A1 Jul. 30, 2020

(51) Int. Cl.
*H04W 12/30* (2021.01)
*G06F 21/55* (2013.01)
*H04L 12/58* (2006.01)
*H04L 12/24* (2006.01)
*H04W 12/02* (2009.01)
*G06F 21/56* (2013.01)

(52) U.S. Cl.
CPC .......... *H04W 12/30* (2021.01); *G06F 21/554* (2013.01); *G06F 21/566* (2013.01); *H04L 41/06* (2013.01); *H04L 51/04* (2013.01); *H04W 12/02* (2013.01); *G06F 2221/034* (2013.01)

(58) Field of Classification Search
None
See application file for complete search history.

(56) References Cited

U.S. PATENT DOCUMENTS 6,671,812 B1 * 12/2003 Balasubramaniam ...................... G06F 21/316 726/22
6,842,861 B1 * 1/2005 Cox .......................... G06F 8/65 710/20

(Continued)

FOREIGN PATENT DOCUMENTS

EP 2680182 A1 1/2014

OTHER PUBLICATIONS

Gruber, Eric; Android Root Detection Techniques; 2013; retrieved from the Internet https://blog.netspi.com/android-root-detection-techniques/; pp. 1-5, as printed. (Year: 2013).*

(Continued)

*Primary Examiner* — Michael W Chao
(74) *Attorney, Agent, or Firm* — Ziegler IP Law Group, LLC

(57) ABSTRACT

A mobile communication device comprising a microphone; a display; a computer storage configured to store an operating system, a messaging application, and one or more other software applications; and a processor configured to execute the messaging application. The messaging application is configured to check for conditions including a status of the operating system and for presence of test-keys; presence of software applications that allow access to the mobile communication device in root mode thereof; and/or an ability to perform operations on behalf of a root user; wherein if the mobile communication device is considered compromised, a visual warning message is displayed on the display.

5 Claims, 2 Drawing Sheets

(56) References Cited

U.S. PATENT DOCUMENTS

| | | | | |
|---|---|---|---|---|
| 7,331,062 | B2* | 2/2008 | Alagna | G06F 21/554 705/44 |
| 7,665,123 | B1* | 2/2010 | Szor | G06F 21/566 726/2 |
| 8,065,695 | B1* | 11/2011 | Smith | G06F 21/572 725/4 |
| 8,387,141 | B1 | 2/2013 | Zhukov et al. | |
| 8,634,539 | B2* | 1/2014 | Grannan | H04M 3/42136 379/265.07 |
| 8,869,282 | B1* | 10/2014 | Lazarowitz | G06F 21/562 726/24 |
| 9,727,737 | B1* | 8/2017 | Hitchcock | G06F 3/04883 |
| 10,171,483 | B1* | 1/2019 | Banerjee | H04L 63/1416 |
| 10,278,074 | B1* | 4/2019 | Shen | H04L 63/145 |
| 10,366,213 | B2* | 7/2019 | Hay | G06F 21/12 |
| 10,757,139 | B1* | 8/2020 | Cignetti | H04L 63/10 |
| 11,082,444 | B2* | 8/2021 | MacLeod | G06F 21/568 |
| 2005/0137980 | A1* | 6/2005 | Bullock | G06Q 30/06 705/44 |
| 2008/0022378 | A1* | 1/2008 | Repasi | G06F 21/51 726/5 |
| 2010/0043072 | A1* | 2/2010 | Rothwell | G06F 21/567 726/24 |
| 2011/0321139 | A1* | 12/2011 | Jayaraman | G06F 21/51 726/4 |
| 2013/0283335 | A1* | 10/2013 | Lakshminarayanan | G06F 21/606 726/1 |
| 2014/0007184 | A1* | 1/2014 | Porras | H04L 63/105 726/1 |
| 2014/0173733 | A1 | 6/2014 | Ford | |
| 2014/0181974 | A1 | 6/2014 | Yablokov et al. | |
| 2014/0281539 | A1 | 9/2014 | Faltyn et al. | |
| 2015/0067830 | A1* | 3/2015 | Johansson | G06F 21/568 726/22 |
| 2015/0279338 | A1* | 10/2015 | Kp | G09G 5/39 345/501 |
| 2015/0332043 | A1* | 11/2015 | Russello | G06F 21/52 726/23 |
| 2016/0094558 | A1* | 3/2016 | Lal | H04L 9/14 713/171 |
| 2016/0099963 | A1* | 4/2016 | Mahaffey | G06F 21/554 726/25 |
| 2016/0314299 | A1* | 10/2016 | Almer | H04L 63/0428 |
| 2016/0360402 | A1* | 12/2016 | Park | H04L 63/0428 |
| 2017/0220396 | A1* | 8/2017 | Xuan | G06F 8/75 |
| 2017/0228524 | A1* | 8/2017 | Hay | G06F 21/12 |
| 2017/0329966 | A1* | 11/2017 | Koganti | G06F 21/554 |
| 2018/0019880 | A1* | 1/2018 | Wu | G06F 21/83 |
| 2018/0063091 | A1* | 3/2018 | Lancioni | H04L 63/20 |
| 2018/0359244 | A1* | 12/2018 | Cockerill | H04L 63/0853 |

OTHER PUBLICATIONS

European Patent Office, Extended European Search Report, Application No. 19020046.9, dated Jul. 24, 2019, 5 pages.

* cited by examiner

MOBILE COMMUNICATION DEVICE AND METHOD OF DETERMINING SECURITY STATUS THEREOF

TECHNICAL FIELD

The aspects of the disclosed embodiments relate generally to mobile communication devices; and more specifically, to securing communications between the mobile communication devices communicating remotely.

BACKGROUND

Generally, mobile communication devices, such as smartphones are used to communicate remotely with one or more similar devices capable of voice and/or data communication. Additionally, data communications between the mobile communication devices are performed by sharing content such as text, images, audio, video, and the like. Furthermore, one or more encryption and decryption techniques are used to secure the data communication between the devices. Typically, data communication is encrypted using a unique code, and decrypted by performing various security steps to decode the encrypted content of the data communication, preferably upon user authentication.

Currently, a typical mobile communication device is configured to authenticate its user prior to providing access to functions of the device. However, recently, the encryption and decryption used to secure the data has been exploited, and consequently, contents of the data communication including personal data or critical information of individuals or entities may be accessed by unauthorised persons, and possibly leaked or otherwise exploited. Particularly, in case of theft, loss, mimicking of mobile communication devices by influence of viruses, device rooting, and the like, the mobile communication devices are compromised and are misused.

Recently, several techniques have been developed to avoid unauthorized access to the functionality of mobile communication devices and their content. However, such techniques are configured to secure the mobile communication devices in presence of manufacturer's certificates. The presence of manufacturer's certificates enables secure access to components (such as for example a microphone, camera, and the like) and applications (such as for example messaging applications, calling applications, and the like) of mobile communication devices upon receiving confirmation from a user. Thus, in the case of an unauthorized user successfully removing the manufacturer's certificates, the unauthorized user can easily and conveniently gain access to the components, data and applications. Consequently, important data and/or information stored within the mobile communication device (such as personal information of the user) is vulnerable to theft, prone to be mimicked and/or hacked. Thus, the conventionally known techniques are inefficient in providing data security and user privacy.

Therefore, in light of the foregoing discussion, there exists a need to overcome the aforementioned drawbacks associated with the conventional techniques of providing improved data security, user privacy and ease of use.

SUMMARY

In a first aspect, the present disclosure seeks to provide a mobile communication device. In a second aspect, the present disclosure invention also seeks to provide a method of determining the security status of a device. The In a third aspect, the present disclosure also seeks to provide a computer program product comprising a messaging application stored on a tangible computer readable storage medium. Aspects of the present disclosure invention seeks to provide a solution to the existing problem of unsafe sharing of data and/or information using mobile communication devices devoid of manufacturer's certificates. An aim of the present disclosure invention is to provide a solution that overcomes at least partially the problems encountered in the prior art and enables secure communication between mobile communication devices.

In one aspect, an embodiment of the present disclosure provides a mobile communication device comprising:
a microphone;
a display;
computer storage configured to store:
an operating system for the mobile communication device;
a messaging application for effecting via a network a secure messaging session between the mobile communication device and at least one remote device; and
one or more other software applications;
and
a processor configured to execute the messaging application, the messaging application having a launched state and an unlaunched state, and on transitioning from the unlaunched state to the launched state, the messaging application is configured either to:
(i) check the status of the operating system and for the presence of test-keys;
check for the presence of software applications that allow access to the mobile communication device in root mode;
check for the ability to perform operations on behalf of a root user;
and
if any of these conditions is met, the mobile communication device is considered compromised and a visual warning message is displayed on the display; or
(ii) determine the occurrence of additional, unauthorized components, libraries, and modules of the operating system; and if any of these is detected a visual warning message is displayed on the display; and
additionally, before initializing an incoming call, the messaging application is configured to check whether it has exclusive access to the microphone, and if the microphone is being used by another software application, the incoming call is canceled.

Embodiments of the present disclosure substantially eliminate or at least partially address the aforementioned problems in the prior art and enable secure communication between the mobile communication device and a remote device by employing a secure messaging application.

In another aspect, an embodiment of the present disclosure provides a method of determining a security status of a device, the method being performed on a mobile communication device comprising:
a microphone;
a display;
computer storage configured to store:
an operating system for the device,
a messaging application for effecting via a network a secure messaging session between the device and at least one remote device; and
one or more other software applications;
and
a processor configured to execute the messaging application, the messaging application having a launched state and an unlaunched state;

the method comprising: on transitioning of the messaging application from the unlaunched state to the launched state, checking with the messaging application:
either
(i) the status of the operating system and for the presence of test-keys;
for the presence of software applications that allow access to the mobile communication device in root mode;
for the ability to perform operations on behalf of a root user; and:
if any of these conditions is met, considering the device to be compromised and displaying a visual warning message on the display; or
(ii) determining the occurrence of additional, unauthorized components, libraries, and modules of the operating system, and if any of these is detected, displaying on the display a visual warning message; and
additionally, before initializing an incoming call, checking with the messaging application whether it has exclusive access to the microphone, and if the microphone is being used by another software application, canceling the incoming call.

In yet another aspect, an embodiment of the present disclosure provides a computer program product comprising a messaging application stored on a tangible computer readable storage medium and configured, when executed on a processor of a mobile communication device, to effect a secure messaging session between the mobile communication device and at least one remote device via a network, the messaging application having a launched state and an unlaunched state, and on transitioning from the unlaunched state to the launched state, the messaging application is configured to check: either
(i) the status of the operating system and for presence of test-keys;
for the presence of software applications that allow access to the mobile communication device in root mode;
for the ability to perform operations on behalf of a root user; and:
if any of these conditions is met, to consider the mobile communication device to be compromised and to display a visual warning message on the display; or
(ii) to determine the occurrence of additional, unauthorized components, libraries, and modules of the operating system, and if any of these is detected, to display on the display a visual warning message; and
additionally, before initializing an incoming call, to check whether the messaging application has exclusive access to a microphone of the mobile communication device, and if the microphone is being used by another software application, to cancel the incoming call.

Additional aspects, advantages, features and objects of embodiments the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
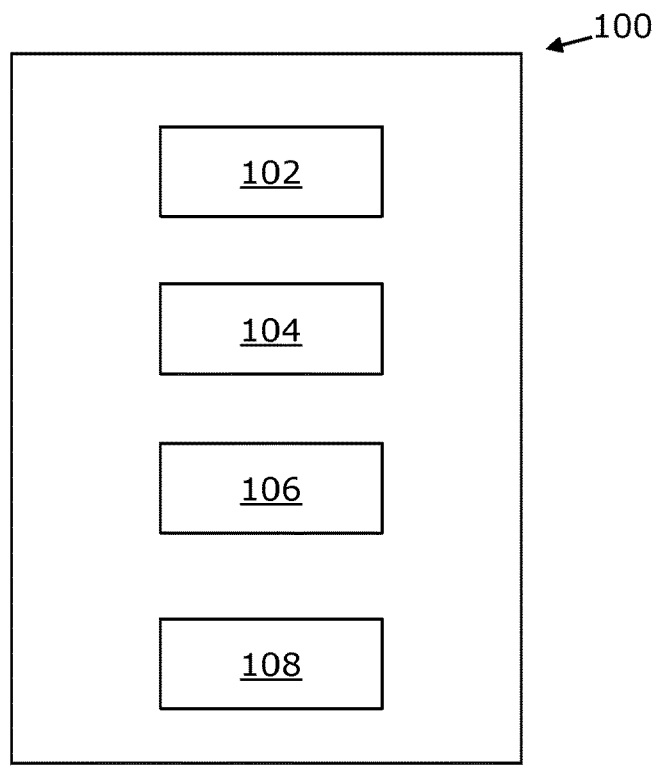
FIG. 1 is a block diagram of a mobile communication device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a mobile communication device comprising:
a microphone;
a display;
computer storage configured to store:
an operating system for the mobile communication device;
a messaging application for effecting via a network a secure messaging session between the mobile communication device and at least one remote device; and
one or more other software applications;
and
a processor configured to execute the messaging application, the messaging application having a launched state and an unlaunched state, and on transitioning from the unlaunched state to the launched state, the messaging application is configured either to:
(i) check the status of the operating system and for presence of test-keys;
check for the presence of software applications that allow access to the mobile communication device in root mode;
check for the ability to perform operations on behalf of a root user;
and:
if any of these conditions is met, the mobile communication device is considered compromised and a visual warning message is displayed on the display; or (ii) determine the occurrence of additional, unauthorized components, libraries, and modules of the operating system, and if any of these is detected, a visual warning message is displayed on the display; and additionally, before initializing an incoming call, the messaging application is configured to check whether it has exclusive access to the microphone, and if the microphone is being used by another software application, the incoming call is canceled.

In another aspect, an embodiment of the present disclosure provides a method of determining the security status of a device, the method being performed on a mobile communication device comprising:

a microphone;

a display;

computer storage configured to store:

an operating system for the device, a messaging application for effecting via a network a secure messaging session between the device and at least one remote device; and one or more other software applications;

and a processor configured to execute the messaging application, the messaging application having a launched state and an unlaunched state;

the method comprising: on transitioning of the messaging application from the unlaunched state to the launched state, checking with the messaging application:

either (i) the status of the operating system and for presence of test-keys;

for the presence of software applications that allow access to the mobile communication device in root mode;

for the ability to perform operations on behalf of a root user; and:

if any of these conditions is met, considering the device to be compromised and displaying a visual warning message on the display; or (ii) determining the occurrence of additional, unauthorized components, libraries, and modules of the operating system, and if any of these is detected, displaying on the display a visual warning message; and additionally, before initializing an incoming call, checking with the messaging application whether it has exclusive access to the microphone, and if the microphone is being used by another software application, canceling the incoming call.

In yet another aspect, an embodiment of the present disclosure provides a computer program product comprising a messaging application stored on a tangible computer readable storage medium and configured, when executed on a processor of a mobile communication device, to effect a secure messaging session between the mobile communication device and at least one remote device via a network, the messaging application having a launched state and an unlaunched state, and on transitioning from the unlaunched state to the launched state, the messaging application is configured to check: either (i) a status of the operating system and for presence of test-keys;

presence of software applications that allow access to the mobile communication device in root mode thereof; and/or an ability to perform operations on behalf of a root user; and:

if any of these conditions is met, to consider the mobile communication device to be compromised and to display a visual warning message on the display; or (ii) to determine the occurrence of additional, unauthorized components, libraries, and modules of the operating system, and if any of these is detected, to display on the display a visual warning message; or additionally, before initializing an incoming call, to check whether the messaging application has exclusive access to a microphone of the mobile communication device, and if the microphone is being used by another software application, to cancel the incoming call.

Embodiments of the present disclosure provide a mobile communication device for enabling secure communication between the mobile communication device and at least one remote device (such as a mobile communication device associated with another user). The mobile communication device comprises a secure messaging application provided on a computer storage of the mobile communication device. Beneficially, the messaging application provides security even when the mobile communication device is in root mode (such that the mobile communication device is devoid of manufacturer's certificates that limits unauthorized use thereof). The messaging application detects unauthorised use of hardware of the mobile communication device, such as, by damaging software applications. Subsequently, the messaging application prevents communication using such a compromised mobile communication device, thereby, protecting a privacy of an authorized user of the mobile communication device and protecting data thereof.

Throughout the present disclosure, the term "mobile communication device" relates to electronic devices such mobile phones, smartphones, tablet computers, laptop computers, and the like. Such mobile communication devices are configured to enable communication of a user thereof with one or more users of similar mobile communication devices (referred to as a "remote device" throughout the present disclosure). Furthermore, the mobile communication devices enable such communication by sharing information or data such as text, voice calls, audio, images, videos, documents, and the like. Moreover, the communication is performed over a network such as a wired or wireless communications network, including but not limited to, LAN or Local Area Network, WAN or Wide Area Network, the internet, telecommunications network (3G or third-generation network, 4G or fourth-generation network, 5G or fifth-generation network, and so forth) and like. Additionally, the mobile communication devices are configured to be authenticated with the network for enabling secure communication thereof, such as secure sharing of information or data.

The mobile communication device comprises a microphone. Throughout the present disclosure, the term "microphone" relates to a hardware component configured to detect audio signals and convert the detected audio signals into electrical signals. The microphone is accessed by the user of the mobile communication device for sharing information in a form of audio signals (that are subsequently converted to electrical signals), such as, while effecting a voice call with a user of a remote device. Such electrical signals are transmitted by the mobile communication device via the network. Moreover, the mobile communication device is configured to take inputs (for example a phone number, email address and the like) from the user about a receiver of the information (or the user of the remote device). The mobile communication device establishes a communication session between the user and the receiver based on the input provided by the user.

The mobile communication device comprises a display. It will be appreciated that the term "display" relates to an electronic screen configured to display information thereon, including but not limited to, text, images, videos, documents and the like. The information may be provided on a graphical user interface presented on the display. Optionally, the display can include LED displays, polychromatic displays, and the like. For example, the display can be an LED touchscreen display that is configured to present information thereon, as well as receive inputs from the user.

The mobile communication device comprises computer storage. Throughout the present disclosure, the term "computer storage" relates to one or more computer-readable memories configured to store data or information therein. Such computer storage can include volatile or non-volatile memory, such as, random access memory (RAM), read-only memory (ROM), magnetic disks, optical disks, secure digital cards (or SD cards) and so forth. Optionally, the computer storage can be implemented as a virtual memory (such as, by employing cloud storage). Furthermore, the user of the mobile communication device can access the data or information stored in the computer storage and may share such data or information via the network.

The computer storage is configured to store an operating system for the mobile communication device. Throughout the present disclosure, the term "operating system" relates to computer software that enables operation of the mobile communication device. For example, the operating system can include Windows®, iOS®, Android® and the like. The operating system acts as an interface between software applications installed on the mobile communication device and hardware components of the mobile communication device, to provide a required functionality of the mobile communication device to the user. In an example, the operating system of the mobile communication device enables the user to install and run various software applications on the mobile communication device. Such software applications are stored in the computer storage and can be accessed by the user. Optionally, such software applications may allow functionality of the mobile communication device including, but not limited to, voice calling, text messaging, video calling, and the like.

The computer storage is configured to store a messaging application for effecting via a network a messaging session between the user device and at least one remote device. Throughout the present disclosure, the term "messaging application" relates to a software application that allows the user to send and receive data or information from the mobile communication device to the remote device via the network. In an example, the messaging application may allow instant messaging, delayed messaging, regular interval messaging and the like. In another example, the data or information shared (such as sent or received) through the messaging application can include text, audio, video, documents, and the like (referred to as a "message" hereinafter). Optionally, the messaging application is configured to share the messages over a registered network. Furthermore, the registered network may be registered (or validated) through one or more other software applications stored in the computer storage and operated by the operating system, wherein such software applications are capable of locating server addresses, fetching and authenticating internet protocols, and the like. Moreover, the registration (or validation) of the network is based on inputs provided by the user, such as, a web address, an internet protocol address, a SIP address, and the like.

The messaging application allows to effect via the network, a secure messaging session between the mobile communication device and at least one remote device. Throughout the present disclosure, the term "messaging session" relates to a specific time duration associated with exchange of one or more messages between the mobile communication device and the at least one remote device using the messaging application. For example, the user of the mobile communication device can commence the messaging session by sending a message to a user of a remote device (or by receiving a message from the user of the remote device). In such an example, the user provides an input (such as a phone number, a web address, an internet protocol address, a SIP address, and the like) associated with the user of the remote device, or selects the user from a list of established messaging contacts, to commence the messaging session. Optionally, the commencement of the messaging session includes validating the remote device by comparing the input provided by the user and a server address of the remote device. In an example, the user initiates a messaging session by sending a message to an email address 'xyz@example.com'. Furthermore, the mobile communication device validates the server address of the user associated with the email address xyz@example.com and subsequently, the transmits the message to the email address. In such an example, the mobile communication device validates the server address by checking a proxy server address of the remote device and consequently, enables secure commencement of the messaging session.

The computer storage is configured to store one or more other software applications. It will be appreciated that the operating system allows the user to install and run the one or more other software applications on the mobile communication device, wherein such one or more other software applications can include, but are not limited to, social media applications, gaming applications, infotainment applications and the like. For example, the user can install a social media application (such as Facebook® messenger) to commence a messaging session with a user associated with at least one remote device.

The mobile communication device comprises a processor configured to execute the messaging application. It will be appreciated that the term "processor" relates to a hardware component configured to receive instructions provided by the user of the mobile communication device (such as, an input provided via a touchscreen of the mobile communication device), process such instructions and provide a corresponding response as an output (such as, displaying of a message on the touchscreen of the mobile communication device). Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. The processor allows execution of the messaging application on the mobile communication device based on an input provided by the user. For example, the user taps on an icon associated with the messaging application, wherein the icon is displayed on a touchscreen of the mobile communication device. Subsequently, the processor is operable to perform various processes associated with execution of the messaging application (such as, for allowing the messaging session), such as receiving an address (such as a phone number) of the at least one remote device as an input from the user, validating a proxy server address associated with the at least one remote device, establishing a secure messaging session by allowing transmission of one or more messages between the mobile communication device and the at least one remote device, and so forth. Furthermore, the messaging application has a launched state and an unlaunched state. It will be appreciated that before execution of the messaging application, the messaging application is in the unlaunched state. In such an instance, no transmission of messages can be performed between the mobile communication device and the at least one remote device, in the unlaunched state of the messaging device. Subsequent to receiving the input by the user to execute the messaging application, the messaging application attains the launched state. Consequently, the messaging session is commenced, and the user can use the messaging application to transmit one or more messages to, or to receive one or more messages from, the at least one remote device.

Throughout the present disclosure, the term "root mode" relates to a state of the mobile communication device when limitations and security restrictions associated therewith are reduced, removed or compromised. Such a root mode of the mobile communication device can be achieved, for example, by modifying the operating system of the mobile communication device, by installing specific software applications that allow root access (which is a form of privileged access) to the mobile communication device, and so forth. The state of the mobile communication device being in the root mode can be identified via various methods, including but not limited to, presence of test-keys (such as a special combination of alphanumeric symbols) on the mobile communication device, presence of specific software applications that allow access to the mobile communication device in the root mode, ability of the user to perform operations on behalf of the root user and so forth. For example, in the root mode, the user can uninstall system applications (such as, software applications installed by a manufacturer of the mobile communication device). It will be appreciated that upon attaining the root mode, the mobile communication device loses some or all of the security restrictions associated with for example the operating system of the device (such as, security restrictions imposed by the manufacturer of the mobile communication device). Consequently, the operation of the mobile communication device can be compromised, leading to an unsafe mode of operation thereof (such as, no passwords or security-keys are required to access hardware or software applications of the mobile communication device).

Furthermore, on transitioning from the unlaunched state to the launched state, the messaging application is configured to check for conditions of the mobile communication device. It will be appreciated that the messaging application is configured to the conditions of the mobile communication device having an operating system such as android operating system or iOs operating system. Specifically, for android operating system, checking with the messaging application includes a status of the operating system and for presence of test-keys. The messaging application is configured to check such conditions to determine whether the mobile communication device is operating in the root mode. Furthermore, the presence of the test-keys in the operating system indicates a possibility of the operating system being in the root mode (or in another compromised state). For example, the messaging application determines a version of the operating system. Subsequently, the messaging application may compare the determined version of the operating system with an expected version of the operating system to identify a version mismatch. Consequently, upon determining the version mismatch, the messaging application identifies the mobile communication device to be operating in the root mode. Alternatively, or additionally, the messaging application is configured to check for the presence of applications that allow access in the root mode. The messaging application analyses various software applications installed on the operating system to identify software applications that can only be accessed in root mode. Alternatively, or additionally, the messaging application is configured to check for an ability to perform operations on behalf of the root user. For example, the messaging application attempts to perform an operation that is only allowed to be performed in the root mode of the mobile communication device. In such an example, if the operation is successfully performed, the messaging application determines the mobile communication device to be in the root mode.

Furthermore, if any of the above mentioned conditions are met, the mobile communication device is considered compromised and a visual warning message is displayed on the display. For example, the messaging application displays the visual warning message, such as, "Your Device is Compromised". Furthermore, the messaging application displays the visual warning message on the display to inform the user that the mobile communication device is compromised, and it may be unsafe for the user to perform further functions (such as, initiate or continue a messaging session).

The messaging application being installed in an iOs operating system, determines the occurrence of additional, unauthorized components, libraries, and modules of the operating system, and if any of these is detected, displaying on the display a visual warning message. It will be appreciated that when the mobile communication device is operating in the root mode, one or more unauthorized users (such as hackers or providers of malware) may have gained access to the mobile communication device. Furthermore, such gaining of access by the unauthorized users may be associated with installation of additional or unauthorized components, libraries, and modules of the operating system that are associated with presence of computer viruses or damaging software applications (such as, software applications that may endanger privacy of an authorized user, generally known as malware) on the mobile communication device. In an example, instant messaging applications are compromised remotely by unauthorized users, to access data or information stored on the computer storage of the mobile communication device. In such an example, the unauthorized users may identify the mobile communication device operating in the root mode and subsequently, install one or more computer viruses or damaging software applications on the mobile communication device.

Furthermore, before initializing an incoming call, the messaging application is configured to check with the messaging application, whether it has exclusive access to the microphone, and if the microphone is being used by another application, the incoming call is canceled. For example, the messaging application tests an operation of the microphone to identify if the microphone is being utilized by another software application installed on the operating system. Subsequently, if the microphone is being utilized by one or more software applications, the processor is configured to determine that the mobile communication device is operating in the compromised state. It will be appreciated that such a utilization of the microphone by one or more software applications can be used by unauthorized users to snoop on audio data of the authorized user of the mobile communication device, such as, during a voice call made by the authorized user. Consequently, a privacy of the authorized user of the mobile communication device is compromised. Therefore, upon determination of the messaging application not having exclusive access to the microphone, the processor is configured to cancel the incoming call. Optionally, the messaging application is configured to display a visual warning message on the display (as mentioned hereinabove).

Optionally, the messaging application is configured to check throughout a messaging application call (whether incoming or outgoing) whether the messaging application has exclusive access to the microphone, and if the microphone is being used by another software application, the messaging application call is canceled. It will be appreciated that compromised software applications may gain access to the microphone at any point during a messaging application call (not only during commencement of the incoming call). For example, the compromised software applications may gain access to the microphone after one minute of commencement of a messaging application call. In such an example, the messaging application is configured to check throughout a messaging application call, such as, after time intervals of five seconds, ten seconds, thirty seconds and so forth, for exclusive access to the microphone. As explained hereinabove, upon determination by the messaging application of one or more software applications (other than the messaging application) having access to the microphone at any point during the messaging application call, the processor is configured to cancel the messaging application call to protect safety and privacy of the user of the mobile communication device.

DETAILED DESCRIPTION OF THE DRAWINGS

Referring to FIG. 1, there is shown a block diagram of a mobile communication device 100, in accordance with an embodiment of the present disclosure. The mobile communication device 100 comprises a microphone 102, a display 104, computer storage 106 configured to store an operating system, a messaging application and one or more other software applications for the mobile communication device. Moreover, the mobile communication device 100 comprises a processor 108 configured to execute the messaging application stored in the computer storage 106.

Figure 2:
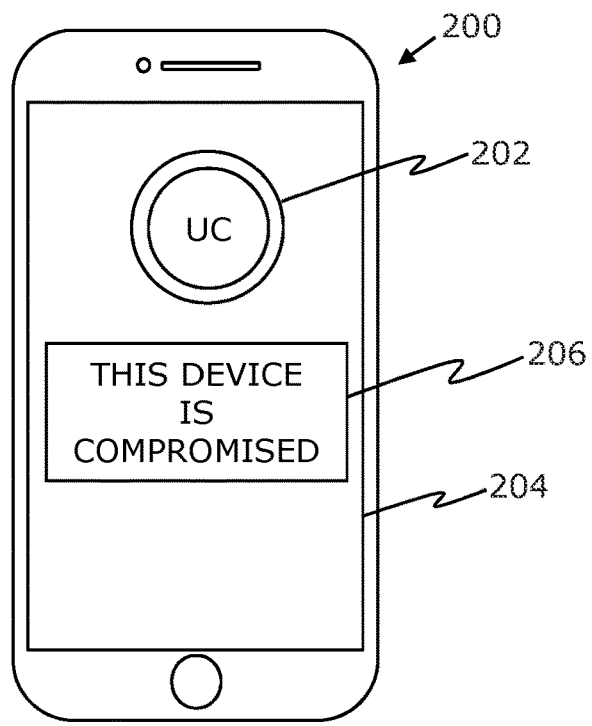
FIG. 2 is a schematic illustration of a mobile communication device, in accordance with an exemplary embodiment of the present disclosure.

Referring to FIG. 2, there is shown a schematic illustration of a mobile communication device 200, in accordance with an exemplary embodiment of the present disclosure. A user is able to access the messaging application 202 via a display 204. The messaging application 202 is configured to check if the mobile communication device 200 is compromised. Furthermore, if the mobile communication device 200 is found to be compromised, a visual warning message 206, such as "THIS DEVICE IS COMPROMISED" may be displayed on the display 204.

Figure 3:
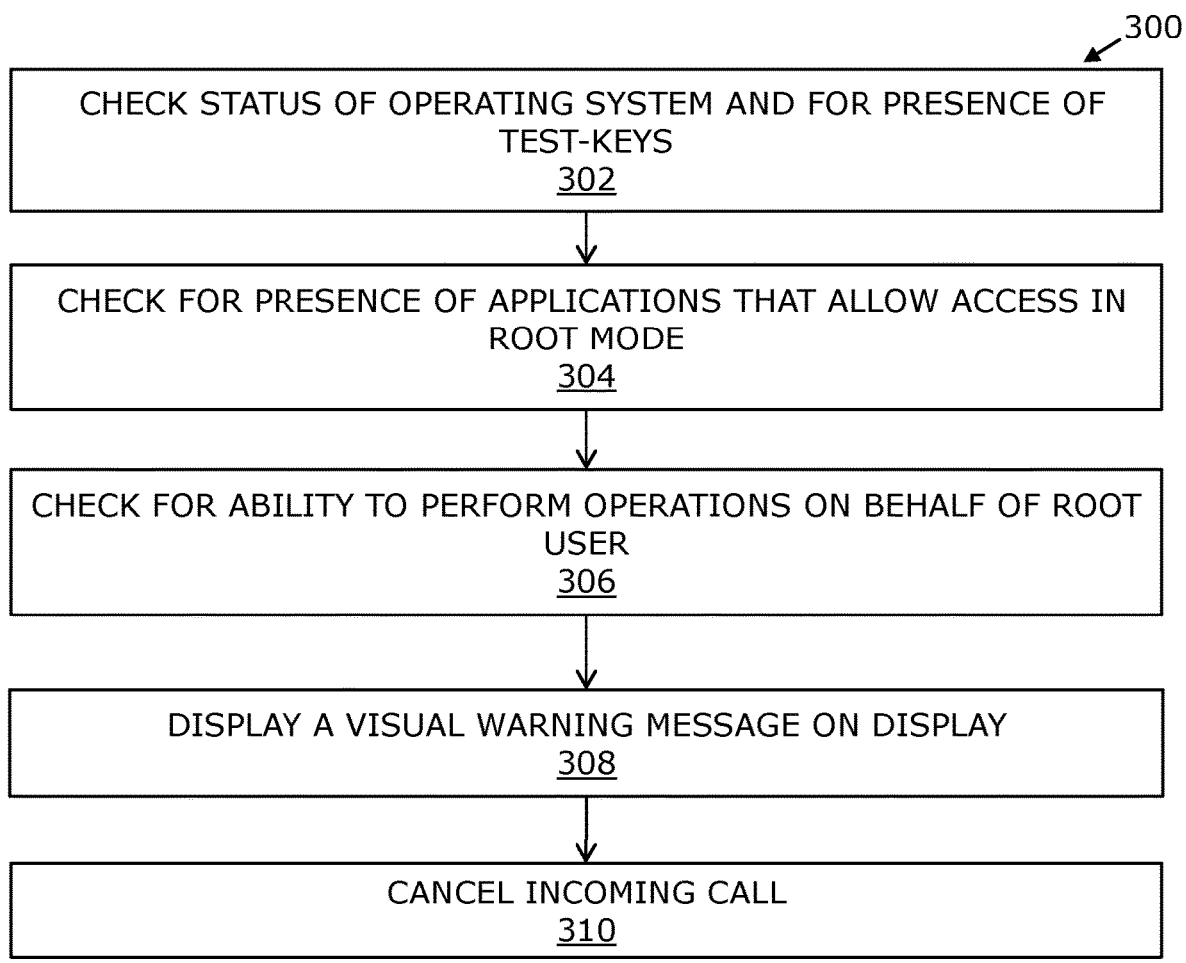
FIG. 3 is an illustration of steps of a method of determining the security status of a mobile communication device being operated by an android operating system, in accordance with an embodiment of the present disclosure.

Referring to FIG. 3, there are shown steps of a method 300 of determining the security status of a mobile communication device being operated by an android operating system (i.e., an android device), in accordance with an embodiment of the present disclosure. At a step 302, the status of the operating system and the presence of test-keys are checked. At a step 304, the presence of software applications that allow access to the mobile communication device in the root mode are checked. At a step 306, the ability to perform operations on behalf of the root user is checked. At a step 308, a visual warning message is displayed on the display. At a step 310, before initializing an incoming call, the messaging application is checked whether it has exclusive access to the microphone, and if the microphone is being used by another application, the incoming call is canceled.

The steps 302 to 310 are only illustrative and other alternatives can also be provided where one or more steps are added, one or more steps are removed, or one or more steps are provided in a different sequence without departing from the scope of the claims herein. For example, the method 300 further comprises checking throughout the incoming call whether the messaging application has exclusive access to the microphone; wherein if the microphone is being used by another software application, canceling the incoming call.

Figure 4:
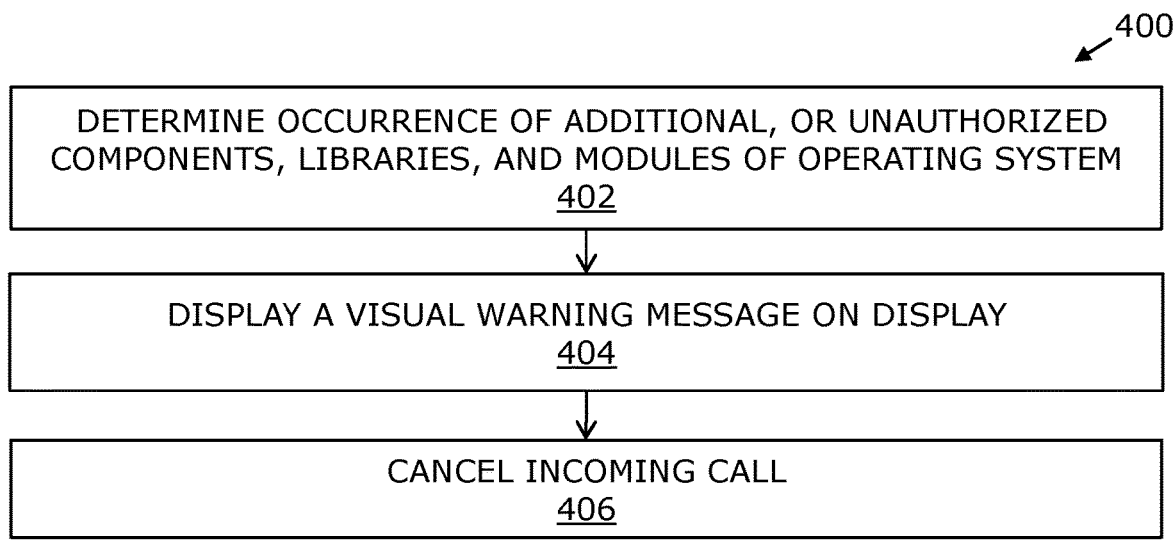
FIG. 4 is an illustration of steps of a method of determining the security status of a mobile communication device being operated by an iOs operating system, in accordance with an embodiment of the present disclosure.

Referring to FIG. 4, there are shown steps of a method 400 of determining the security status of a mobile communication device being operated by an iOs operating system (i.e., an iOs device), in accordance with an embodiment of the present disclosure. At a step 402, an occurrence of additional unauthorized components, libraries, and modules of the operating system is determined. At a step 404, a visual warning message is displayed on the display. At a step 406, before initializing an incoming call, the messaging application is checked whether it has exclusive access to the microphone, and if the microphone is being used by another application, the incoming call is canceled.

The steps 402 to 406 are only illustrative and other alternatives can also be provided where one or more steps are added, one or more steps are removed, or one or more steps are provided in a different sequence without departing from the scope of the claims herein. For example, the method 400 further comprises checking throughout the incoming call whether the messaging application has exclusive access to the microphone; wherein if the microphone is being used by another software application, canceling the incoming call.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A mobile communication device comprising:
   a microphone;
   a display;
   computer storage configured to store:
      an operating system for the mobile communication device;
      a messaging application for effecting via a network a secure messaging session between the mobile communication device and at least one remote device; and
      one or more other software applications;
   a processor configured to execute the messaging application;
   the messaging application having a launched state and an unlaunched state, and on transitioning from the unlaunched state to the launched state, the messaging application is configured to:
      check a status of the operating system and for presence of test-keys;
      check for presence of software applications that allow access to the mobile communication device in root mode thereof;
      check for an ability to perform operations on behalf of a root user;

determine occurrence of additional, unauthorized components, libraries, and modules of the operating system;

before initializing an incoming call, check whether the messaging application has exclusive access to the microphone, and if the microphone is being used by another software application, the incoming call is cancelled, and if any of these conditions are met, the mobile communication device is considered compromised and a visual warning message is displayed on the display.

2. The mobile communication device as claimed in claim 1, wherein the messaging application is configured to check throughout a messaging application call whether the messaging application has exclusive access to the microphone, and if the microphone is being used by another software application, the messaging application call is cancelled.

3. A method of determining a security status of a device, the method being performed on a mobile communication device comprising:

a microphone;
a display;
computer storage configured to store:
an operating system for the device,
a messaging application for effecting via a network a secure messaging session between the device and at least one remote device; and
one or more other software applications;
a processor configured to execute the messaging application, the messaging application having a launched state and an unlaunched state;
the method comprising, on transitioning of the messaging application from the unlaunched state to the launched state, checking with the messaging application:
a status of the operating system and for presence of test-keys;
for a presence of software applications that allow access to the mobile communication device in root mode thereof;
for an ability to perform operations on behalf of a root user;
for occurrence of additional, unauthorized components, libraries, and modules of the operating system, and if any of these is detected, displaying on the display a visual warning message;
before initializing an incoming call, checking with the messaging application whether it has exclusive access to the microphone, and if the microphone is being used by another software application, cancelling the incoming call; and:
if any of these conditions are met, considering the device to be compromised and displaying a visual warning message on the display.

4. The method as claimed in claim 3, further comprising checking throughout a messaging application call whether the messaging application has exclusive access to the microphone; wherein if the microphone is being used by another software application, cancelling the messaging application call.

5. A computer program product comprising a messaging application stored on a tangible non-transitory computer readable storage medium and configured, when executed on a processor of a mobile communication device, to effect a secure messaging session between the mobile communication device and at least one remote device via a network,
the messaging application having a launched state and an unlaunched state, and on transitioning from the unlaunched state to the launched state, the messaging application is configured to check:
a status of the operating system and for presence of test-keys;
for a presence of software applications that allow access to the mobile communication device in root mode thereof;
for an ability to perform operations on behalf of a root user;
for occurrence of additional, unauthorized components, libraries, and modules of the operating system, and if any of these is detected, to display on the display a visual warning message;
before initializing an incoming call, to check whether the messaging application has exclusive access to a microphone of the mobile communication device, and if the microphone is being used by another software application, to cancel the incoming call; and
if any of these conditions is met, to consider the mobile communication device to be compromised and to display a visual warning message on the display.

* * * * *